United States Patent [19]

Bullough

[11] 3,765,878

[45] Oct. 16, 1973

[54] ALUMINUM-SILICON ALLOYING PROCESS

[75] Inventor: Vaughn Lynn Bullough, Florence, Ala.

[73] Assignee: Reynolds Metals Company, Richmond, Va.

[22] Filed: July 21, 1972

[21] Appl. No.: 273,797

[52] U.S. Cl. .................................. 75/148, 75/68 R
[51] Int. Cl. ............................................. C22c 1/06
[58] Field of Search ........................... 75/148, 68 R

[56] References Cited
UNITED STATES PATENTS
2,755,178   7/1956   Rasmussen............................ 75/148

3,434,824   3/1969   Johnston ............................. 75/68 R

*Primary Examiner*—Richard O. Dean
*Attorney*—John F. C. Glenn et al.

[57] ABSTRACT

Process for producing silicon-aluminum alloys which involves reacting a high-purity silica with molten aluminum in the presence of a flux at 900°–1,200°C for about 1 to 24 hours and controlling the quantity of flux and the rate of addition of the reactants such that any alumina in the system does not substantially exceed the amount which is soluble in the flux.

6 Claims, No Drawings

ALUMINUM-SILICON ALLOYING PROCESS

BACKGROUND OF THE INVENTION

1. Field of the Invention

This invention relates to a process for preparing silicon-aluminum alloys. It also relates to a process for minimizing siliceous effluents incident to producing such alloys. Specifically, this invention relates to the reduction of silica with aluminum at 900°–1200°C under cover of a molten salt flux to produce silicon-aluminum alloys.

2. Review of the Prior Art

The reduction of aluminum silicates, such as common clay, by metallic aluminum is an electric furnace at a temperature of about 2,500°C is disclosed in U. S. Pat. No. 732,410 of C. H. Homan. Carbon electrodes are used, the bottom electrodes being stationary and the top electrode being adjustable. The molten contents are removed by tapping the furnace.

In the Girsewald et al., U. S. Pat. No. 1,972,432, at the other extreme, crushed $SiO_2$ is used as a filter medium under pressure for a molten aluminum-silicon alloy containing 23% Si, but the silica does not react with these metals. The $SiO_2$ and the dross retained thereby are fed to an electrothermic process for recovery operations. It is noted that absorption of carbon tends to occur, producing sticky, spongy masses that cannot be tapped from the furnace, if silica content in the charge is too small and silicon content in the alloy is less than 30 percent.

Johnston's U. S. Pat. No. 3,434,824 discloses the liquid-phase reduction of alumina with elemental silicon at temperatures of 1,900°–1,950°C when both alumina and silicon are molten, even though the melting point of alumina per se is about 2,020°C. The alloys produced generally contain about 10 percent aluminum.

The Schmidt et al. process of U. S. Pat. No. 3,254,988 describes a process for producing aluminum-silicon alloys by a sequence of (a) submerged-arc reduction of briquets containing a carbonaceous reducing agent, bauxite and clay, (b) centrifugal separation at 578°–680°C (near the eutectic point) to yield a liquid phase and a solid phase, and (c) comminution and sieving of this solid phase to increase alloy recovery and isolate undesired impurities and high-silicon material capable of causing conductive bridges which lower the furnace temperature. Reference to the phase diagram of alumina and silica show that a ratio of 57% $Al_2O_3$ and 43% $SiO_2$ has a melting point of about 1,810°C so that operating with a relatively high proportion of silica can lead to the formation of gummy, viscous products containing oxides, carbides, and reduced metals which tend to accumulate at the cooler parts of the furnace and cause its eventual shutdown.

In U. S. Pat. No. 3,116,997, Kohlmeyer et al. point out that as of about 1959, the upper limit of aluminum in aluminum-silicon alloys was considered to be about 70 percent, as compared to an upper limit of 65 percent some 30 years earlier, and disclose an electrothermal reduction process for making substantially carbon-free aluminum-silicon alloys, having more than 72 percent aluminum, from alumina-silica raw materials at 2050°–2200°C. This process diminishes carbon contamination by restricting time of exposure to critical temperatures.

These prior art processes show that problems with carbide formation and with limiting the lower levels of silicon content in aluminum-silicon alloys tend to occur and that problems with impurities are continually present in production of aluminum-silicon alloys.

In addition, the art has long been aware that attempts to produce aluminum silicon alloys via the reduction of silica in electrolytic reduction cells presents many problems with respect to the evolution of gaseous by-products. In fact, the literature has reported severe silicon losses and workers skilled in the art have postulated that such losses were due to the evolution of silicon tetrafluoride.

SUMMARY OF THE INVENTION

Aluminum-silicon alloys are generally produced by alloying silicon with molten aluminum. These alloys are commonly produced in alumina reduction plants, cast houses, secondary aluminum smelters, aluminum reclamation plants, and any facilities having holding furnace capacity. In the production of silicon or ferrosilicon in conventional arc furnaces from ores such as silica rock, silicon losses as high as 15 percent are common. The process of this invention enables a variety of silicon-aluminum alloys to be produced under conditions affording substantially full recovery of silicon as an Al-Si alloy.

In this process, a source of high-purity silica such as crushed high-purity sandstone, glass sand, crushed glass, or quartzite, is fed with stirring to a furnace or crucible containing molten aluminum which is covered with a molten salt flux. Silica materials generally regarded as suitable for this process will normally contain in excess of 95 wt. percent $SiO_2$ and will be controlled in the amount of $Fe_2O_3$ and $TiO_2$ contained according to the alloy to be produced. The preferred flux is cryolite, which may contain various additives of the type commonly used in the electrolytic bath of an alumina reduction cell.

The process of this invention also involves using enough flux to dissolve or otherwise tie up the alumina formed, thereby keeping it from interfering with the silica-aluminum reaction. This amount of flux will provide a final $Al_2O_3$ concentration of 7–20 wt. percent. Excess aluminum (over the stoichiometric amount required to react substantially all of the silica) is provided so as to recover silicon as an Al-Si alloy of the desired silicon content, preferably one in which the silicon content is low enough to achieve a pourable alloy consistency.

This process is useful for the direct preparation of alloys having a silicon content in the range of about 1–20 percent and also for the preparation of master alloys having silicon contents of perhaps as high as 40 percent. The overall reaction involved in this process at a temperature of 900°–1200°C is as follows:

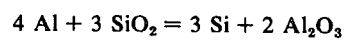

It is apparent that no gases are generated by this reaction, and significantly no substantial evaporation, volatilization, or sublimation is involved therein.

For reasons which are not completely understood, it has now been found that the above reaction proceeds much more rapidly if it is carried out in the presence of a flux effective to dissolve alumina. While not wishing to be bound by any theory of operation, it appears that the alumina which is formed by the reaction of silica with molten aluminum tends to build up and interfere with the major reaction which is taking place. Additionally, this build-up of alumina can cause uneven heating at localized spots thereby detracting from the overall control of the primary reaction. In any event, a reaction rate effective to produce an alloy of 5 to 10 percent silicon content in as little as 2 to 4 hours (typically at about 2 to 4 percent silicon content per hour during the first 5 hours) can be achieved, even at 1,000°C, compared to only 1 percent after as much as 15 to 20 hours when operating without the flux.

As has heretofore been stated, the process of this invention is carried out merely by contacting high purity silica with molten aluminum in the presence of a flux at a temperature ranging from 900° to 1,200°C, for a period of about 1 to 24 hours, and recovering an alloy consisting essentially of aluminum and silicon, the flux having a catalytic effect concerning the rate of reaction. Further advantage is obtained by controlling the quantity of flux and the rate of addition of silica so as not to exceed the capacity of the flux for tying up alumina formed in the system, thereby keeping it away from the silica-aluminum reaction sites. The use of enough flux to maintain a fluid consistency of the flux cover is generally preferred, in order to avoid entrapment of unreacted silica and expedite feeding. The fluxes which are employed in the novel process of this invention are those which are conventionally used in electrolytic cells, the most common being cryolite. Other additives may include about 1–10 percent by weight of one or more of the fluorides of calcium, lithium or magnesium, to control specific gravity, viscosity or melting point of the flux, as well as minor amounts of aluminum fluoride or sodium carbonate to control acidity of the flux.

It is to be immediately understood that the process of this invention can be carried out in a regular holding type furnace, as well as in an electrolytic cell for the reduction of alumina to form aluminum metal. If the operation is carried out in an electrolytic cell (at about 950°–990°C) then, in accordance with the present invention, the rate at which alumina is charged to the electrolytic cell must be decreased so as to insure that the total amount of alumina which is present in the system over any appreciable period of time does not substantially exceed an amount which can be dissolved by the flux. The resulting Al-Si alloy may contain up to about 25 percent silicon by weight.

Alumina is produced as a by-product which is soluble in the flux and can be used as feed for an electrolytic cell in the production of aluminum. There are no problems with carbide formation or contamination from other materials because both the aluminum and the silica can be selected with any desired limits of impurities.

The process of this invention is illustrated with the following examples:

EXAMPLE 1

Using an electrolytic reduction cell, 500 grams of aluminum were melted under approximately 8,000 grams of cryolitic electrolyte containing additives normally used in the electrolytic production of aluminum and also containing 318 grams of Bayer alumina. To this electrolyte, 553 grams of crushed Kentucky sandstone containing 98.2 weight percent $SiO_2$, 0.5 weight percent $Fe_2O_3$, 1.0 weight percent $Al_2O_3$ and 0.1 weight percent $TiO_2$ were added. After electrolysis at an anodic current density of about 8 amp./in.$^2$ for 5 hours, a sample of the alloy produced contained 20 percent silicon.

EXAMPLE 2

Using an electric furnace and operating at a controlled rate of addition of silica, 4,000 grams of aluminum were melted under 3,000 grams of cryolitic flux containing the additives normally used in the electrolytic production of aluminum. Crushed Kentucky sandstone, analyzed as in Example 1, was then added in increments of 100 to 400 grams at hourly intervals over a 4-hour period until a total of about 1,300 grams of sandstone has been added to the melt. At the end of 5 hours, the alloys produced analyzed about 13 percent silicon. Upon holding for an additional 14 hours, the silicon in the alloy had increased to about 16 percent silicon. About 96.3 percent of the silicon content of the sand added to the furnace was accounted for in the alloy produced, indicating that silica losses can be virtually eliminated by controlling the silicon content of the electrolyte below saturation level.

EXAMPLE 3

As an investigation of the quality of the spent cover flux as a cryolite make-up for conventional electrolytic cells, 1,000 grams of aluminum (having a silicon content of 0.35 percent), 326 grams of silica sand (319.5 grams $SiO_2$) and 6,557 grams of cryolite electrolyte ($SiO_2$ 0.2% and $Al_2O_3$ 2%), containing additives normally used in electrolytic production of aluminum, were melted together and held at about 980°C with occasional stirring for 5 hours. At that time, the alloy produced contained 19.25 percent silicon. Analysis of the cover flux indicated that it contained approximately 7.3 percent alumina and only 0.13 percent silicon.

Material balance calculations confirmed the quantitative conversion of sand to silicon aluminum alloy, indicating that 149.3 grams of silicon had been produced from 319.5 grams of silica, and that 191.7 grams of aluminum had been converted into 361 grams of $Al_2O_3$. Consequently, 808 grams of aluminum alloyed with 149.3 grams of silicon produced a 19.25 percent silicon-aluminum alloy.

EXAMPLE 4

8,000 pounds of crushed Kentucky sandstone, similar to that used in Example 1, were used as part of the feed over a 10-week period to a commercial cell used in the electrolytic production of aluminum by the Hall process. The sandstone was fed to the cell in small increments (20 to 50 pounds) every 2–4 hours and the alumina feed to the reduction cell was reduced to compensate for the alumina generated by the reaction of the sand with molten aluminum. The silicon content of the alloy produced ranged from 3–10 percent and was held at 5 percent silicon during about 75 percent of this test period. Calculations based on the amount of metal produced and chemical analysis of the alloy indicated that 99.3 percent of the silica added to the cell was converted to silicon in the alloy. The ampere efficiency of the cell during this period was 85 percent.

What is claimed is:

1. In the process of preparing aluminum-silicon alloys having silicon contents below 40 percent, the improvement which comprises adding high-purity silica to molten aluminum in the presence of a cover flux at a reaction temperature of 900°–1200°C and holding at said reaction temperature for about 1–24 hours, said flux being present in an amount effective to increase the rate of reaction and achieve alloying to an extent of at least about 2 to 4 percent silicon content per hour during the first 5 hours.

2. The improvement of claim 1 wherein said cover flux is essentially molten cryolite.

3. The improvement of claim 1 including controlling the rate of addition of silica and the quantity of flux such that the alumina content of the system does not substantially exceed that amount which is soluble in said cover flux.

4. The improvement of claim 1 wherein the reaction is carried out in an electrolytic cell for the reduction of alumina to form aluminum, and to react the aluminum with said high-purity silica and produce an Al-Si alloy containing up to about 25 percent silicon by weight, the rates of addition of alumina and silica being such that the total amount of alumina in the system does not substantially exceed that amount which is soluble in said cover flux.

5. The process of claim 4 wherein said cover flux is essentially molten cryolite.

6. The improvement of claim 5 wherein said reaction temperature is about 950°–990°C.

* * * * *